United States Patent Office 2,741,592
Patented Apr. 10, 1956

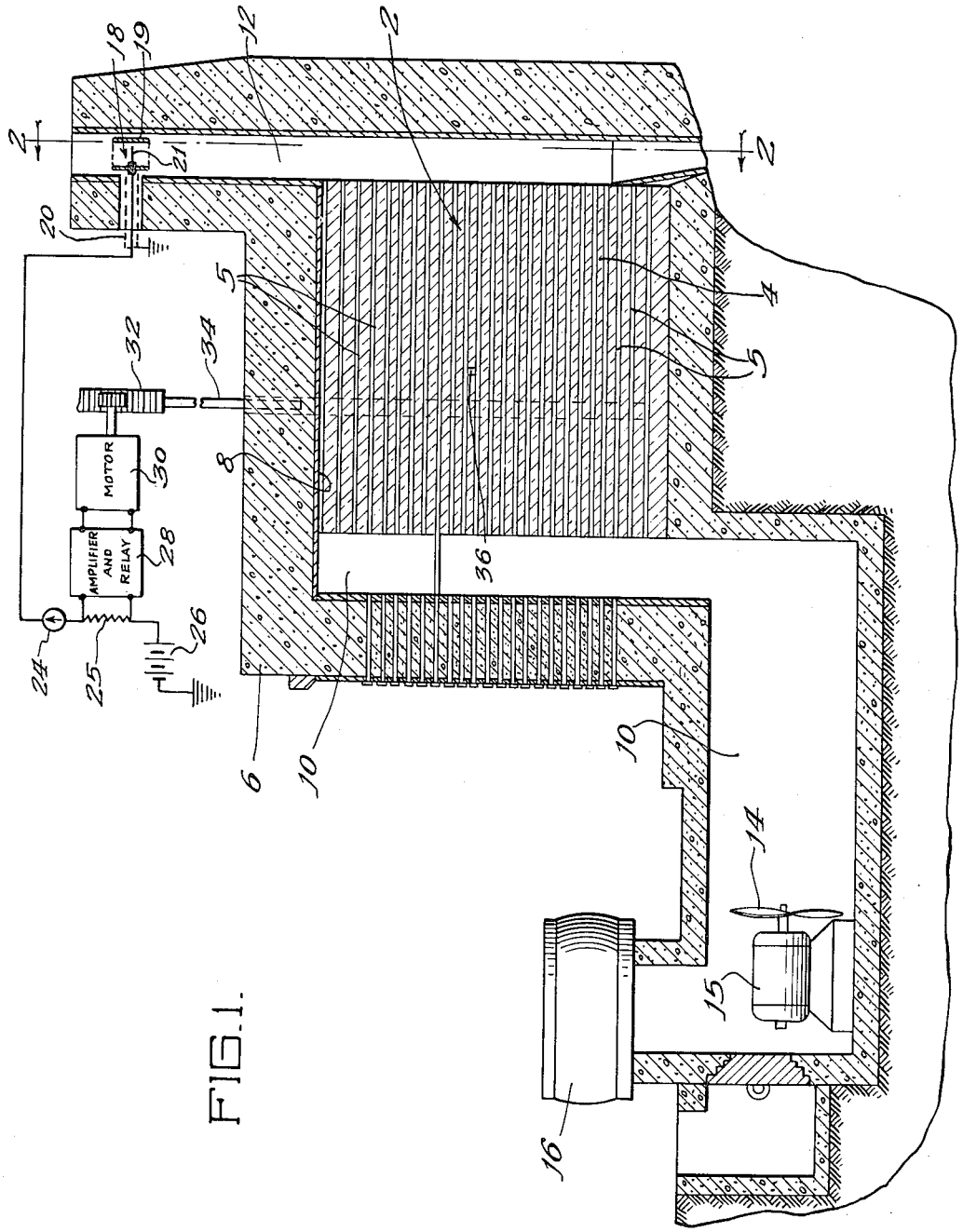

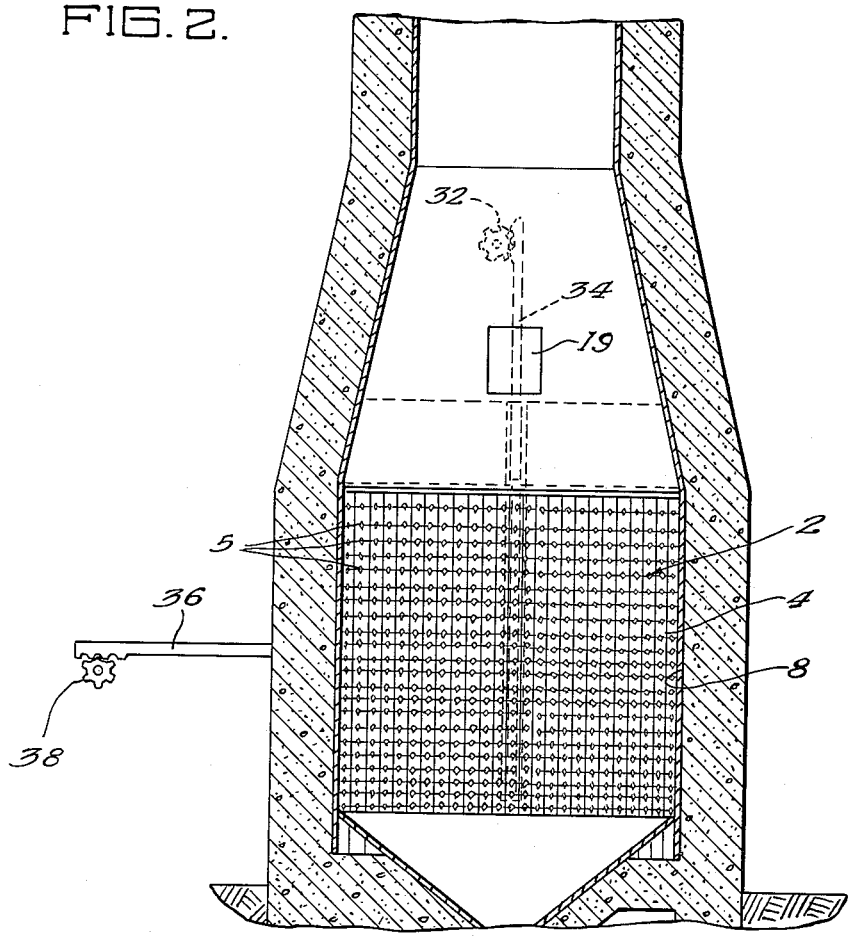

2,741,592
NEUTRONIC REACTOR MEASURING AND SAFETY ROD OPERATING APPARATUS

Lyle B. Borst, Sayville, N. Y., and Henry W. Newson, Oak Ridge, Tenn., assignors to the United States of America as represented by the United States Atomic Energy Commission Application December 31, 1946, Serial No. 719,376

1 Claim. (Cl. 204—193)

This invention relates to nuclear physics and more particularly to a novel method and means for determining the power output of a neutronic reactor capable of sustaining a nuclear fission chain reaction.

A general object of the invention is to provide a novel means for accurately and efficiently determining the neutron density within a neutronic reactor.

A more specific object of the invention is to measure the neutron density within such a reactor by passing a gas such as air therethrough, measuring the radioactivity of the neutron bombarded gas emanating from the reactor, obtaining an electrical indication from said bombarded gas and utilizing same in operating a safety rod to terminate the reaction.

The foregoing and other objects and advantages of the invention will become apparent from a consideration of the following specification and the accompanying drawings, wherein:

Fig. 1 is a fragmentary side view, partly in elevation and partly in central vertical section, of a structure embodying the invention, in combination with an electric circuit diagrammatically illustrated and adapted to measure the neutron density; and Fig. 2 is a vertical cross sectional view taken on the line 2—2 of Fig. 1.

Describing the invention in detail, a neutronic reactor generally designated 2 comprises a graphite cube 4 with a plurality of longitudinal horizontal air passages 5 therethrough containing fissionable material (not designated), as in the construction fully shown and described in a copending Fermi and Szilard application, Serial No. 568,904, now patent No. 2,708,656 filed December 19, 1944 (Figs. 31 and 32).

The reactor 2 is disposed within a concrete vault 6 comprising a reaction chamber 8 and inlet and outlet passages 10 and 12 (Fig. 1) communicating therewith. An air fan or impeller 14 driven by an electric motor 15 is disposed within the inlet passage 10, the suction side of said fan 14 being in communication with the atmosphere through a conventional filter 16, whereby air is urged through the inlet passage 10 and the reactor passages 5, and thence outwardly from the vault 6 through the outlet passage 12.

It will be understood by those skilled in the art that the air flowing through the reactor passages 5 will absorb heat developed within the reactor 2 for the purpose of cooling the same, and, if desired, for the purpose of operating an associated power device not shown.

It may be noted that the air passing through the passages 5 is subjected to neutron bombardment, thus producing radioactive isotopes of the neutron absorbent components of the air. The most significant element in the atmosphere from this standpoint is argon inasmuch as the other components of the air either have a very small neutron capture cross section (e. g. oxygen and helium) or produce radioactive isotopes with very short half-lives (e. g. nitrogen[16]) as the result of neutron bombardment. Thus, the principal radioactive gas flowing through the outlet passage 12 is argon[40] which has a half-life of 110 minutes. The concentration of argon[40] in the air flowing through the passage 12 has been found to be directly proportional to the neutron density within the reactor 2, thus affording an indication of the neutron density or power output of the reactor.

The power output is measured by a conventional ionization chamber diagrammatically indicated at 18 and disposed within the passage 12. The respective electrodes 19 and 21 of the chamber 18 are connected to the central conductor and shield, respectively, of a conventional coaxial cable 20. The shield of the cable 20 is connected to ground, and the central conductor is connected in series with a galvanometer 24, a resistor 25, and one terminal of any suitable voltage supply or source 26, the other terminal of which is grounded.

As is well known in the art, the current through the ionization chamber 18 and thus the indication of the galvanometer 24 and the voltage appearing across the resistor 25 are proportional to the radioactivity of the gas flowing through the passage 12 and the chamber 18. If desired, means may be provided which are responsive to the current in the ionization chamber 18 for inserting a safety rod into the reactor. To accomplish this, the voltage appearing across resistor 25 may be amplified and caused to operate an electric motor 30 by a conventional amplifier and relay 28, when the concentration of argon[40] in the air flowing through the passage 12 reaches a predetermined maximum value. Under these conditions, the motor 30 operates a rack and pinion mechanism 32 for the purpose of inserting a safety rod 34 into the reactor 2 through complementary passages in the vault 6 and the cube 4. The rod 34, as will be readily apparent to those skilled in the art, is formed of any highly neutron absorbent material, such as cadmium, which is thus operable to reduce the neutron reproduction ratio within the reactor. It may be noted that the rod 34 functions as a safety rod for the purpose of terminating the reaction under emergency conditions when the power output reaches a predetermined maximum value. Although only one rod 34 is illustrated in the drawings, any desired number may be utilized. Minor variations in the neutron density are controlled in the usual manner by one or more horizontal control rods 36 operatively connected to motor means (not shown), as by rack and pinion means indicated at 38 (Fig. 2).

It will be understood that, if desired, the suction side of the impeller 14 may be connected to a container or any other suitable source of any desired gas such as helium having a relatively low neutron capture cross section, under which conditions, a small amount of argon or any other neutron absorbent gas may be mixed with the helium to afford means for measuring the power output of the pile, as above described.

It will be understood that the above-described embodiment of the invention is merely by way of illustration, inasmuch as various modifications and embodiments of the invention will be readily apparent to those skilled in the art without departing from the spirit of the invention or the scope of the appended claim.

What is claimed is:

In combination with a neutronic reactor comprising an active portion and means for flowing atmospheric air therethrough to remove the heat generated in the reaction, an air outlet duct connected to receive air so passed through the active portion, an ionization chamber within the duct through which the air passes, and indicating means connected to the ionization chamber to indicate the intensity of radioactivity of the air within the duct and means responsive to the current in the ionization chamber for inserting a safety rod into the reactor.

References Cited in the file of this patent

UNITED STATES PATENTS

| | | |
|---|---|---|
| 2,220,509 | Brons | Nov. 5, 1940 |
| 2,599,922 | Kanne | June 10, 1952 |
| 2,708,656 | Fermi et al. | May 17, 1955 |

OTHER REFERENCES

Snell: Physical Review, vol. 49 (Apr. 1936), pp. 559–560.

Smyth: Atomic Energy for Military Purposes, Princeton University Press (1945), pp. 232, 233.